(12) United States Patent
Vuong et al.

(10) Patent No.: US 6,240,077 B1
(45) Date of Patent: May 29, 2001

(54) DYNAMIC WIRELESS MULTIPLEXING — SWITCHING HUB FOR PROVIDING TWO-WAY COMMUNICATIONS WITH SUBSCRIBER UNITS

(75) Inventors: Thomas T. Vuong, Milpitas, CA (US); Hung Nguyen, Cary, NC (US)

(73) Assignee: Golden Gate Tele Systems Inc., Milpitas, CA (US)

(*) Notice: Subject to any disclaimer, the term of this patent is extended or adjusted under 35 U.S.C. 154(b) by 0 days.

(21) Appl. No.: 09/112,843

(22) Filed: Jul. 9, 1998

(51) Int. Cl.[7] .................................................. H04J 4/00
(52) U.S. Cl. ........................ 370/330; 370/319; 370/321
(58) Field of Search .................................. 370/281, 295, 370/319, 321, 344, 441, 479, 337, 347, 442, 330, 280

(56) References Cited

U.S. PATENT DOCUMENTS

| | | | |
|---|---|---|---|
| 5,533,023 | * | 7/1996 | Ohlson et al. . |
| 5,539,730 | * | 7/1996 | Dent . |
| 5,737,330 | * | 4/1998 | Fulthorp et al. ...................... 370/346 |
| 5,790,527 | * | 8/1998 | Janky et al. ........................... 370/330 |
| 5,835,487 | * | 11/1998 | Campanella ......................... 370/316 |
| 5,943,324 | * | 8/1999 | Ramesh et al. ...................... 370/321 |
| 5,982,761 | * | 11/1999 | Dutta .................................... 370/337 |

* cited by examiner

Primary Examiner—Douglas W. Olms
Assistant Examiner—Ken Vanderpuye
(74) Attorney, Agent, or Firm—Nguyen & Associates

(57) ABSTRACT

A dynamic, efficient, and full-duplex wireless local network is presented. The local central station equipment is implemented by implementing a Frequency Division Multiple Access (FDMA) technique on local inbound data and a Time Division Multiple Access (TDMA) technique on at least local outbound data. Conversely, each subscriber unit implements the TDMA technique on local outbound data and the FDMA technique on local inbound data. In so doing, wireless two-way communications can be established between the central station, subscriber units, and remote stations wherein the allocated carrier frequency band is fully utilized and the outbound data bandwidth can be dynamically adjusted to accommodate the bandwidth requirements of different communication applications.

31 Claims, 11 Drawing Sheets

DYNAMIC WIRELESS MULTIPLEXING — SWITCHING HUB FOR PROVIDING TWO-WAY COMMUNICATIONS WITH SUBSCRIBER UNITS

FIELD OF THE INVENTION

The invention generally relates to the field of communication systems, and more particularly relates to digital wireless communication systems.

BACKGROUND OF THE INVENTION

The deserving popularity of the Internet as an entertainment and information source has fueled an insatiable demand for faster, more flexible, and more dynamic communications inter-networks. Communications inter-networks are now used to transport all types of data including text, graphics, audio, video, and others. There are two kinds of communications inter-networks: wired and wireless.

In general, wireless inter-networks may be more preferable over wired inter-networks because of the low installation costs as well as the protracted installation time required. A wireless communication inter-networks consists of sub-networks (e.g., Local Area Networks (LANs)) that communicate together through the use of gateways (a.k.a. routers) over wired wideband links. Each sub-network is designed to provide coverage to a predetermined local geographical area and consists of a central station (a.k.a. hub) and a number of subscriber units located within that local area. The central station and the subscriber units are linked together through wireless Radio Frequencies (RF) narrow band links. Narrow band links, instead of wideband links, are used in sub-networks because of costs and practicality reasons.

In short, in a wireless communication sub-network, the central station serves as a relay station for communications between local subscriber units. The central stations also serve as relay stations for long-distance communications between sub-networks. Due to limitation in wireless communication resources (e.g., frequency, time, power, transmission loss, and others), different methods have been developed to more efficiently make use of these resources. Some of the methods include Frequency Division Duplex (FDD), Frequency Division Multiple Access (FDMA), Time Division Duplex (TDD), Time Division Multiple Access (TDMA), Code Division Multiple Access (CDMA), and others. Generally, the above methods involve either frequency sharing or time-sharing.

Presently, to allow for full duplex wireless communications, (i.e., transmit and receive simultaneously) separate transmit and receive frequency bands are used. However, to prevent interference and leakage between the transmit and receive frequency bands, a frequency gap is normally introduced between the transmit and receive frequency bands. Such frequency gap is known as the middle frequency band. The middle frequency band may be as wide as 10 MHz which is a sizeable unused amount of a precious communications resource. Such unused frequency band is even more significant given the small bandwidth of the narrow band links between the subscriber units to the central station in a sub-network.

More importantly, as mentioned earlier, current demands dictate that all types of data including text, audio data, and video data be provided over communication inter-networks. This presents a difficult challenge given the fixed bandwidth of the narrow band links used in sub-networks. While such fixed bandwidth are adequate for the average application which is likely to involve voice data (e.g., telephones) and may require a bandwidth of approximately 64 Kbps, they are extremely inadequate for applications involving high data transfer rates such as video conference or Internet video download which may require a bandwidth of as high as several Mbps. Because the bandwidth of the narrow band links is fixed, they can not readily and practically be reconfigured to accommodate these applications.

U.S. Pat. No. 5,005,169 issued Apr. 2, 1991 to Bronder et al. (hereinafter Bronder et al.) discloses a communications system for sending information over the guardbands. The system under Bronder et al. describes how a spread spectrum modulated information carrying signal is inserted in the guard bands that exist in the conventional Frequency Division Multiplexing (FDM) structure. In other words, Bronder et al. describes a system that uses the CDMA method. The guard band defined here is a small narrow frequency band (25 kHz) between two adjacent information carrying bands. However, it is well-known that the distance coverage that CDMA provides is rather limited.

U.S. Pat. No. 5,267,233 issued Nov. 30, 1993 to Bauerschmidt (hereinafter Bauerschmidt) describes a communication system that combines a FDM structure with a Time Division Duplex (TDD) structure. The Bauerschmidt system uses a voice detector to switch off the receiver so that data bits for transmission can be transmitted on the same time slot of the same channel. However, such TDD structure is at best a half-duplex communication technique. Accordingly, the Bauerschmidt system does not provide full duplex communications.

Thus, a need exists for a dynamic full duplex wireless communication system, apparatus, and method that implements widely accepted communication methods, makes efficient use of the allocated frequency band in transferring text, audio, and video data, and has large distance coverage.

SUMMARY OF THE INVENTION

Accordingly, the present invention provides a dynamic full duplex wireless communication apparatus that implements widely accepted communication methods, makes efficient use of the allocated frequency band in transferring text, audio, and video data, and has large distance coverage.

The present invention meets the above need with an apparatus, which is used as a central station of a wireless local network of subscriber units, for providing two-way communications to and between the subscriber unit. The apparatus comprises a receiving circuit, a transmit circuit, a Radio Frequency (RF) antenna, and a first modulator-demodulator (modem) circuit.

The receiving circuit receives at least wireless local inbound data from the subscriber units wherein the wireless local inbound data is transferred using a Frequency Division Modulation Access (FDMA) technique. The transmit circuit is coupled to the receiving circuit and is used to transmit at least wireless local outbound data to the subscriber units wherein the wireless local outbound data is transmitted using a Time Division Modulation Access (TDMA) technique.

The RF antenna is coupled to the receive and transmit circuits. The RF antenna is used to radiate and receive at least the local inbound and outbound data. The first modem circuit is coupled to the receive and transmit circuits. The first modem circuit is used to demodulate local inbound data and to modulate local outbound data.

Under the implemented FDMA technique, a carrier frequency band is allocated to each subscriber unit such that the carrier frequency band is divided into a transmit carrier frequency band and a receive carrier frequency band. Moreover, under the implemented TDMA technique, the local outbound data are transmitted as a plurality of slots in a time sequence such that each slot contains data designated for a particular subscriber unit and a multiplicity of slots can be adjusted to accommodate a bandwidth requirement of a communication application.

Preferably, the wireless local network is coupled to other local networks to make up an inter-network. In that case, the apparatus further comprises a second modem circuit which is coupled to the receive and transmit circuits. The second modem circuit is used to demodulate long-distance inbound data received from remote stations of the other local networks and to modulate long-distance outbound data transmitted to the other local networks.

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. Throughout this document, the term inbound refers to the direction from a subscriber unit or a remote station (remote hub) to the central station (hub). Conversely, the term outbound refers to the direction from the central station to a subscriber unit. Moreover, the term local data refers to data transferred between a subscriber unit and a central station in the local sub-network. The term long distance data refers to data transferred between central stations of different sub-networks. While the description below primarily applies to a wireless communication inter-network, it is to be appreciated that the present invention is applicable to other configurations of communication inter-networks such as hybrid wireline/wireless inter-networks, cellular, and others.

In a hybrid wireline/wireless inter-network, not only does the central station provide inter-device connectivity between the subscriber units and the remote station that are wireless based, it also provides similar connectivity for the wireline based subscriber units and the wireline based gateway links to other long-distance networks. It should be clear to a person of ordinary skill in the art that in so far as applications of devices, such as multiplexors, Channel Banks, and Private Branch Exchange (PBX), as well as methods required in supporting the connectivity between wired subscriber units and wired gateway links are widely known. Therefore, except where noted, the procedures, methods, and devices that are of the above applications will not be described in details so as not to unnecessarily obscure aspects of the present invention.

In a cellular configuration, it should be clear to a person of ordinary skill in the art that the cell base station is analogous to the central station and the mobile units are analogous to subscriber units. Additionally, in such cellular configuration, it should be clear to a person of ordinary skill in the art that transfer handshakes are allowed when mobile units move between cells.

Figure 1:
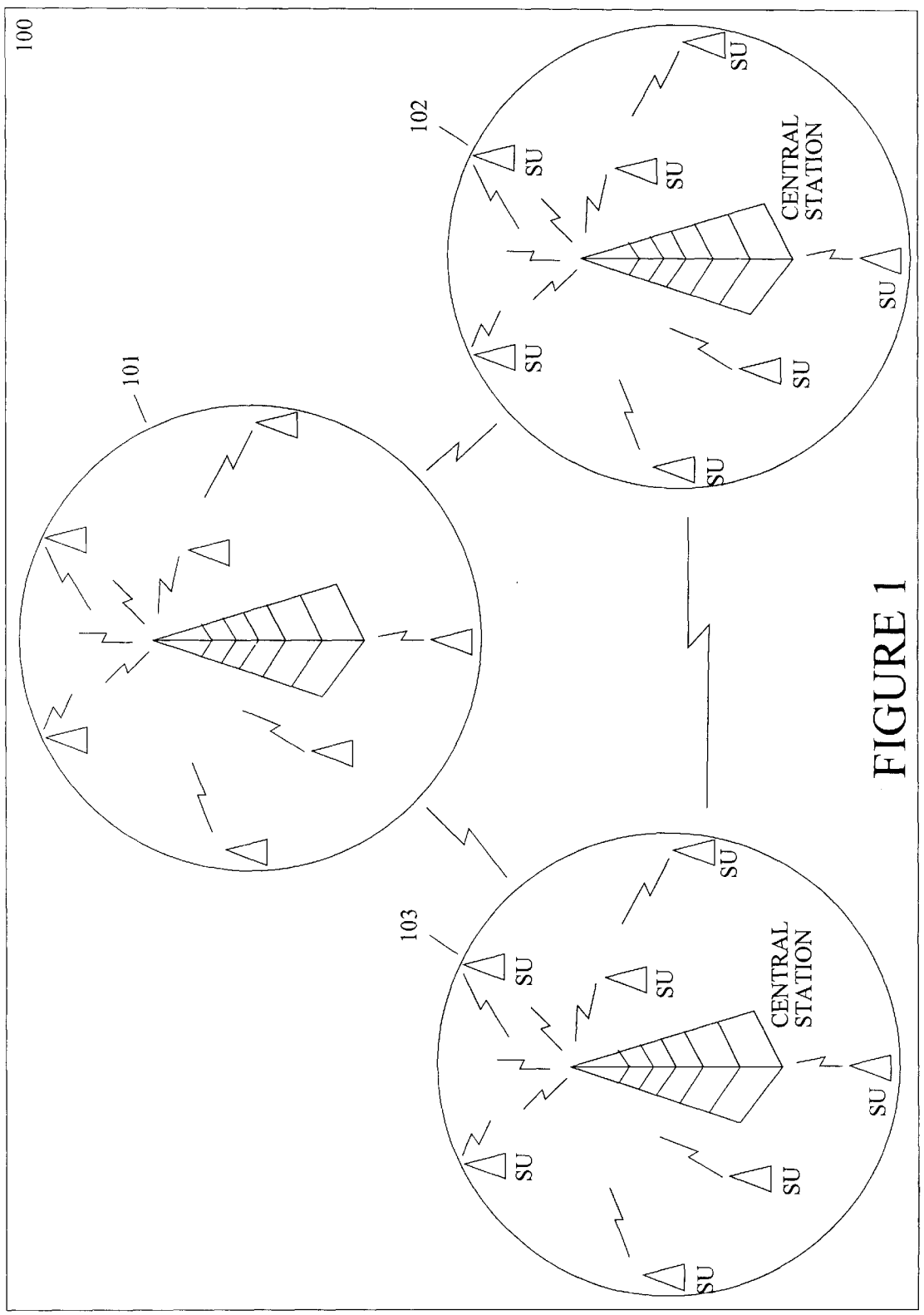
FIG. 1 illustrates a diagram of a typical wireless communication inter-network that implements the present invention.

FIG. 1 illustrates, for example, a high-level diagram of a wireless communication inter-network 100 in which the present invention may be implemented or practiced. As shown in FIG. 1, inter-network 100 comprises three sub-networks 101–103 wherein each sub-networks is designed to provide coverage to a predetermined local geographical area and consists of a central station (hub) and a number of subscriber units located within that local area. A subscriber unit may be a private home, small business, cellular telephone, or others. In a nutshell, a subscriber unit is generally a RF apparatus that is capable of modulating, encoding, formatting, and transmit requests to a designated central station. In addition, a subscriber unit is also capable of receiving, demodulating, decoding, and converting the formatted data into the required form (e.g., voice, data, fax, etc.) for the user. Similarly, central station is an apparatus that acts as a relay station to receive and route data to the appropriated local subscriber unit and/or remote station in other sub-networks. In other words, the central station acts to direct data to its destination according to instructions encoded in the data. Obviously, the central station must be able to handle multiple and large data flows. Either the central station or the subscriber units can initiate the connection to the other party by sending request signals and at the same time monitoring response signals on one of the idle channels. If the request signals are subsequently acknowledged by positive response signals, the parties may continue their conversation on the above-mentioned idle channel (inbound frequency/outbound timeslot pair), or on a new channel arrangement that is communicated during the connection acknowledgment. This sequence is termed 'connection hand-shake'.

The central station and the subscriber units are linked together through a narrower band Radio Frequency (RF) link on inbound data and a wider band RF link on outbound data. On the other hand, the central stations of sub-networks 101–103 are coupled together by wideband inter-network 104 which preferably includes telephone networks as well as high speed data network. In the preferred embodiment, wideband inter-network 104 is a wired inter-network. However, it is to be appreciated that wideband inter-network 104 can also be a wireless inter-network as well. Accordingly, inter-network 104 provides access to the Internet, video libraries, and networked databases. To transmit and receive RF signals, the central stations and subscriber units all have RF apparatus equipment equipped with microwave antennas.

The wireless communication system under the present invention is implemented as part of the central station (hub) equipment and the subscriber units (SUs). In accordance to the preferred embodiment of the present invention, by implementing a Frequency Division Multiple Access (frequency based) technique to receive local inbound data from the subscriber units and by implementing a Time Division Multiple Access (time based) technique to transmit outbound data, a dynamic full-duplex wireless communication system that makes efficient use of the allocated frequency band can be constructed. Under this embodiment, the communication system provides two-way communications while making full use of the middle band frequency previously designated for preventing interference and leakage. Moreover, the communication system in accordance to the present invention can adjust to dynamically provide the bandwidth necessary for different applications including high data transfer rates required for video transmission. Furthermore, the communication system in accordance to the present invention utilizes well-known and widely accepted technology in FDMA and TDMA techniques.

As such, for compatibility with the preferred embodiment, the subscriber units in a sub-network should be able to transmit data in FDMA format and receive data in TDMA format. Remote stations in other sub-networks should be able to receive local data from subscriber units in FDMA format, receive long distance data from other stations in TDMA format, and transmit both local and long distance data in TDMA format. While it is imperative that the central station be able to receive local data from subscriber units in FDMA (frequency based) format and transmit local data in TDMA (time based) format under the present invention, the central station may receive and transmit long distance data from/to remote stations in FDMA format or other formats and still be within the scope of the present invention.

Figure 2:
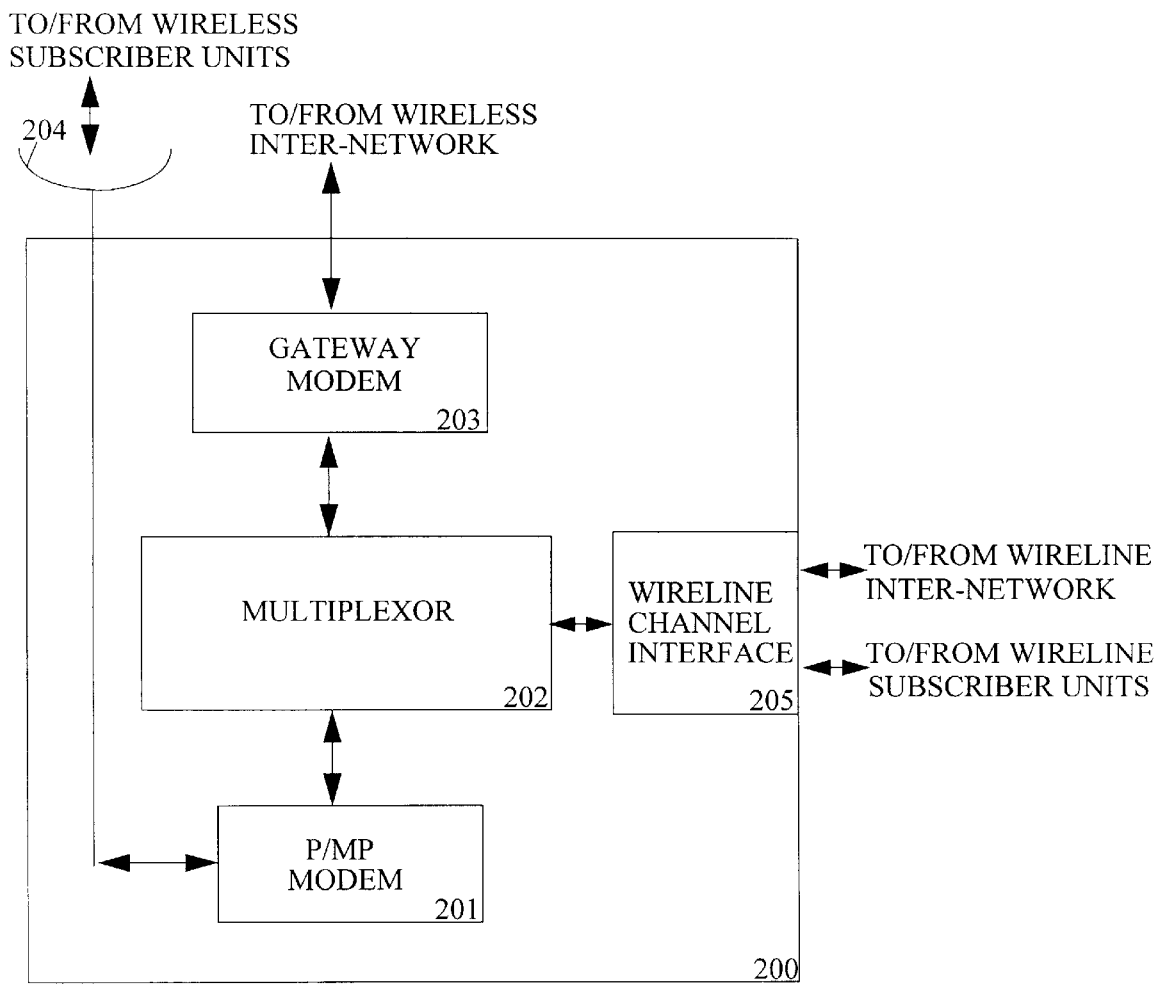
FIG. 2 is a high-level block diagram illustrating a wireless multiplexing/switching central station in accordance to the present invention.

Reference is now made to FIG. 2 illustrating the central station (hub) equipment in accordance to the present invention. As shown in FIG. 2, central station 200 comprises point-to-multiple-point (hereinafter p/mp) modem 201, multiplexor 202, gateway modem 203, RF antenna 204, and wireline channel interface 205. Inbound local data received by RF antenna 204 is provided to p/mp modem 201 which modulates the local inbound data using a carrier frequency selected for the particular connection to the subscriber unit. More particularly, in accordance to the present invention, each subscriber unit is assigned an outbound carrier frequency for receiving data as required under the TDMA technique. Moreover, each subscriber unit is designed to dynamically select an inbound carrier frequency. An inbound carrier is normally required under the FDMA technique. To allow for full duplex communication, the transmit (outbound) frequency is kept separate from the receive (inbound) frequencies.

In an embodiment where a wireless inter-network is implemented, for utility and flexibility reasons it is desirable to have the local network frequencies co-existed with the long-distance communication frequencies. Under the present invention, a middle guardband (a frequency gap) that is located between the long-distance outbound frequency and the long-distance inbound frequency can be used for a combination of a few local outbound frequencies and a large multiplicity of local inbound frequencies. This can be accomplished because the energy required to transmit local data for a short distance between the central station and the subscriber units is lower than that for transmitting long-distance data. As a result, a few sub-bands (i.e., sub-divisional frequencies) within the middle guardband can be allocated for local outbound data and still leave sufficient sub-bands within the middle guardband for local in-bound data. Under the present invention, a second guardband is implemented between the local outbound frequency band and the local inbound frequency band. This second guardband is very narrow and therefore allows both local outbound frequency sub-bands and local inbound frequency sub-bands to co-exist.

As such, under the present invention, p/mp modem 201 may receive multiple local inbound data from different subscriber units at the same time. In which case, p/mp modem 201 must demodulate all local inbound data received which had been modulated with their corresponding carrier frequency by the subscriber unit according to the FDMA technique. The demodulated data signals, which are formatted in the frequency domain under the FDMA method, is then provided to an amplifier inside p/mp mode 201 which boosts the signal strength to improve reception. The amplified data signal is then provided to a frequency splitter inside p/mp modem 201 which separates the signals based on the signal's carrier frequency. In other words, the frequency splitter demultiplexes the input signals into predetermined outputs based on their carrier frequencies. The demultiplexed signals are then provided as outputs to multiplexor 202.

Figure 3:
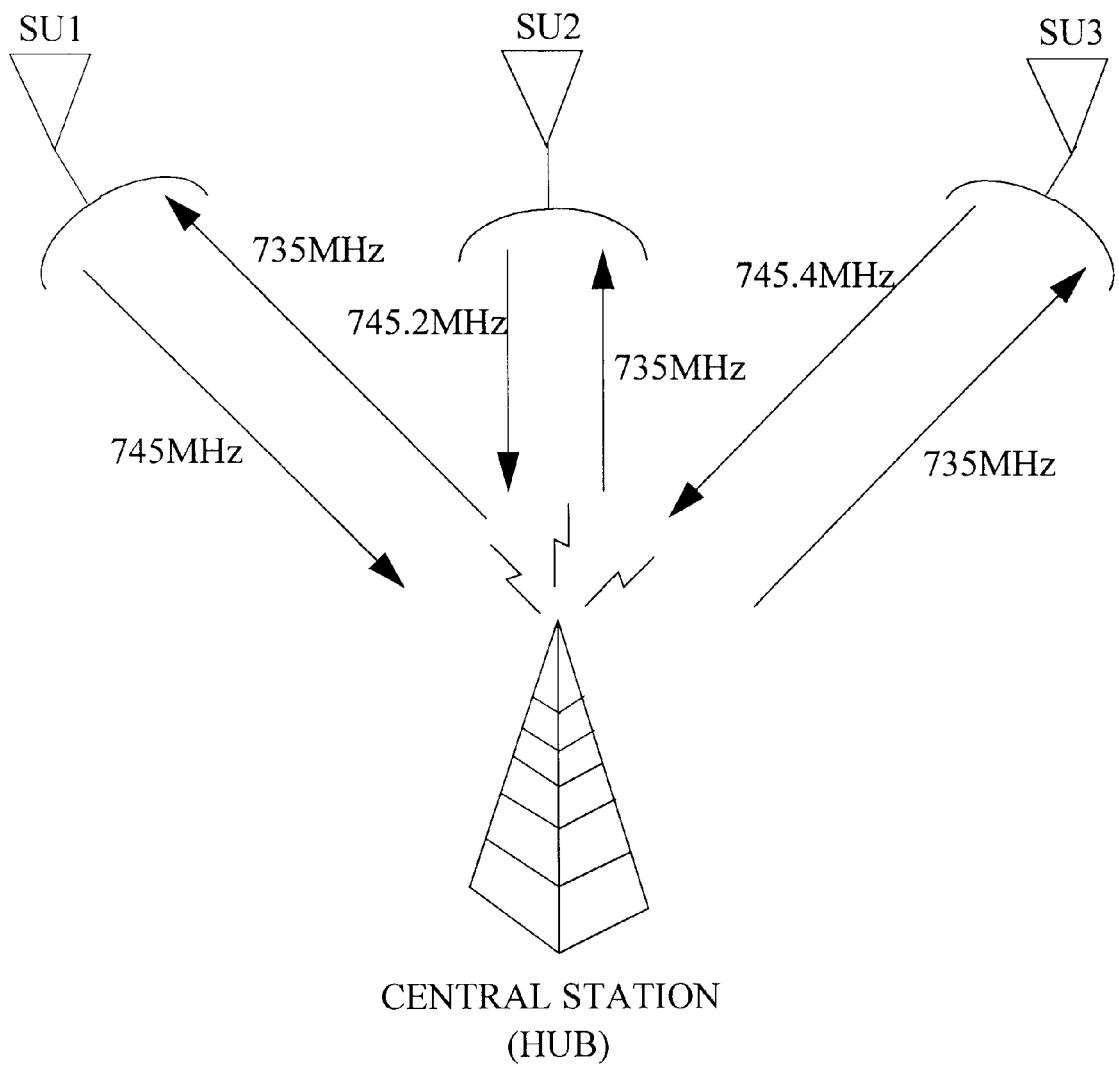
FIG. 3 is a diagram illustrating, as an example, a Frequency Division Multiple Access (FDMA) implementation in accordance to the present invention.

Referring now to FIG. 3 illustrating an exemplary FDMA implementation in accordance to the present invention. As shown in FIG. 3, a local sub-network consists of a central station and subscriber units 1–3. In FIG. 3, each subscriber unit transmits to the central station on a different inbound carrier frequency (e.g., 745.0 MHz, 745.2 MHz, and 745.4 MHz). However, each subscriber unit is assigned the same outbound carrier frequency (e.g., 735 MHz). It should be clear to a person of ordinary skill in the art, more than one outbound carrier frequencies can be assigned to the subscriber units. Hence, in using the FDMA technique for transmission, multiple subscriber units can communicate to central station 200 simultaneously using their dynamically allotted transmit carrier frequencies. In an embodiment that supports wireless local networking, the middle frequency guardband, which is used to prevent interference and leakage for long-distance communication in FIG. 1, is further utilized to provide the inbound carrier frequencies that are dynamically allotted to selected subscriber units as their transmit carrier frequency in accordance to the present invention.

Referring back to FIG. 2, p/mp modem 201 then provided the demodulated inbound data signals to multiplexor 202 which generally determines the destination of the demodulated inbound data from its content and formats the demodulated inbound data according to a standard communications protocol as necessary. In other words, depending on its destination, multiplexor 202 needs to format the inbound data to meet either the communication protocol required for transmission to other remote stations over the wideband links or to the communication protocol required for local transmission to subscriber units. Next, multiplexor 202 modulates the formatted data with a carrier transmit frequency which has been selected according to the TDMA scheme. In the preferred embodiment, a single carrier transmit frequency is used for all outbound data. However, it is to be appreciated that more than one single carrier transmit frequencies can be allocated to outbound data. For example, more than one carrier transmit frequencies may be used for local outbound data and more than one carrier transmit frequencies can be used for inter-network outbound data. Multiplexor 202 then sends the modulated data either to gateway modem 203 or back to p/mp modem 201 for broadcast to the remote stations or local subscriber units, respectively. Wireline channel interface 205 provides an interface to wireline subscribe units and also allows central station 200 to connect to a wireline inter-network.

Figure 4:
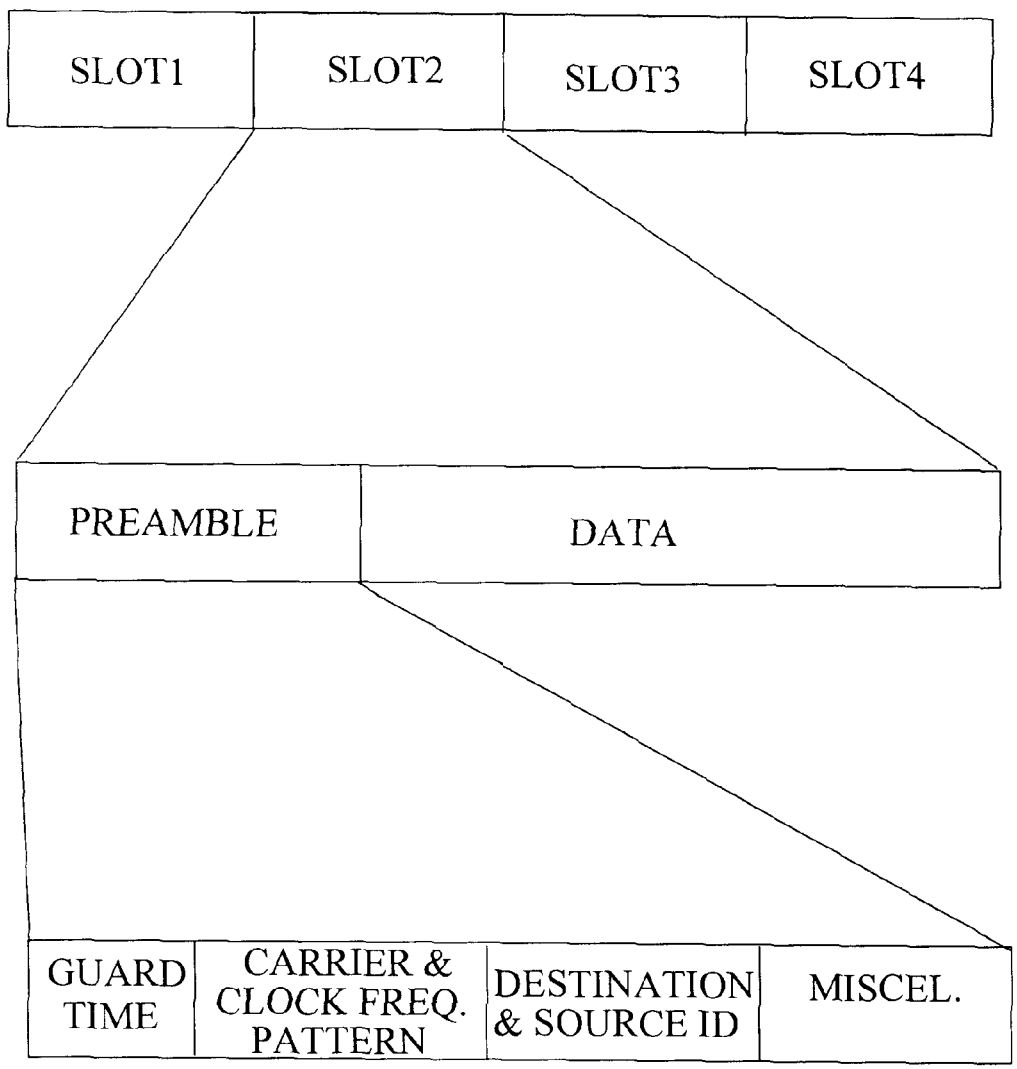
FIG. 4 is a diagram illustrating, as an example, a Time Division Multiple Access (TDMA) implementation in accordance to the present invention.

In broadcasting outbound data according to the TDMA scheme, multiplexor 202 has at least the entire local transmit data rate capacity of central station 200 at any one time. Outbound data are sent in frames wherein each frame contains one burst of information for each central station allowed broadcast time. FIG. 4 illustrates, as an example, a TDMA transmission frame implemented in accordance to the present invention. As shown in FIG. 4, each frame is subdivided into time sequential slots each of which contains data for a specific subscriber unit or a specific remote station. Hence, depending on the application of a certain subscriber unit or remote station, more or fewer number of timeslots are used to accommodate the application data bandwidth requirement. Each slot consists of a preamble which is followed by the data information. The preamble generally consists of a guard time portion to prevent against invalid data, a carrier & clock recovery pattern, destination and source identification to indicate the data destination, and miscellaneous information. Miscellaneous information may include, for example, data (e.g., voice, text, video, signaling data type) or other communication information.

Conversely, gateway modem 203 may receive multiple inbound data from different central stations of different sub-networks at the same time. In which case, gateway modem 203 must demodulate all data received which had been modulated with a selected carrier frequency according to the TDMA scheme prior to being sent by the remote station. Gateway modem 203 then provided the demodulated data signals to multiplexor 202 which generally determines the destination of the demodulated inbound data from its content and formats the demodulated inbound data according to a standard communications protocol as necessary. In other words, depending on its destination, multiplexor 202 needs to format the data to meet either the communication protocol required for transmission to other remote stations over the wideband links or to the communication protocol required for local transmission to subscriber units. Next, multiplexor 202 modulates the formatted data with a carrier transmit frequency which has been selected according to the TDMA scheme. Then, multiplexor 202 sends the modulated data either back to gateway modem 203 or to p/mp modem 201 for broadcasting to remote stations or local subscriber units, respectively.

In the preferred embodiment, local inbound data from each subscriber unit is transferred at a conventional rate of 64Kbps (i.e., the digitization rate per channel is 8000 samples/second ×8 bits/samples). Conversely, the local outbound data is being broadcast at a multiple of the conventional rate of 64 Kbps. It should be clear to a person of ordinary skill in the art that a multiple of the conventional rate of 64Kbps or of any particular rate other than 64Kbps can be used for both inbound and outbound data.

Figure 5:
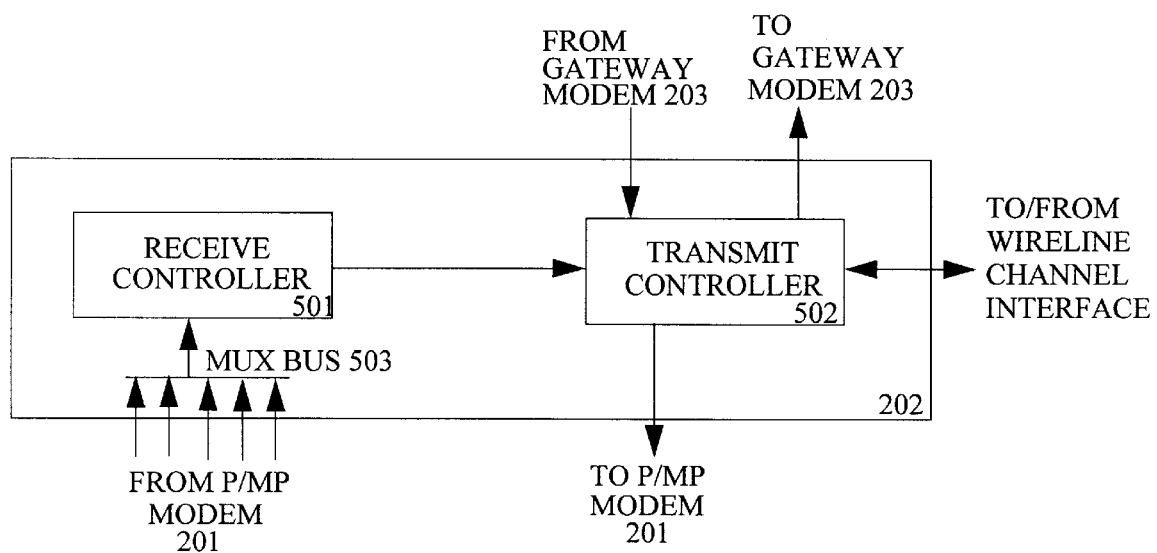
FIG. 5 is a block diagram illustrating multiplexor circuit 202 in accordance to the present invention.

Reference is now made to FIG. 5 illustrating in more detail multiplexor 202. As shown in FIG. 5, multiplexor 202 comprises receive controller 501, transmit controller 502, and multiplexor bus 503. The demultiplexed local inbound data, which is formatted in frequency domain under the FDMA method, from p/mp modem 201 is provided to multiplexor bus 503 which in turn provides it to receive controller 501. On the other hand, if the demodulated data signals received is from remote stations (long-distance data), they are formatted in time domain under the TDMA method. The data is sent directly to transmit controller 502.

More importantly, to carry out the dynamic bandwidth allocation scheme in accordance to the present invention, receive controller 501 and transmit controller 502 are designed to implement a physical communication layer. More specifically, transmit controller 502 of the central station is designed to send data out on multiple timeslots according to the TDMA scheme. Receive controller 501 of the central station is designed to identify the modulation type on a particular frequency and to automatically adjust the data rate higher or lower accordingly. Such implementation should be clear to a person of ordinary skill in the art and is not further discussed here.

Figure 6:
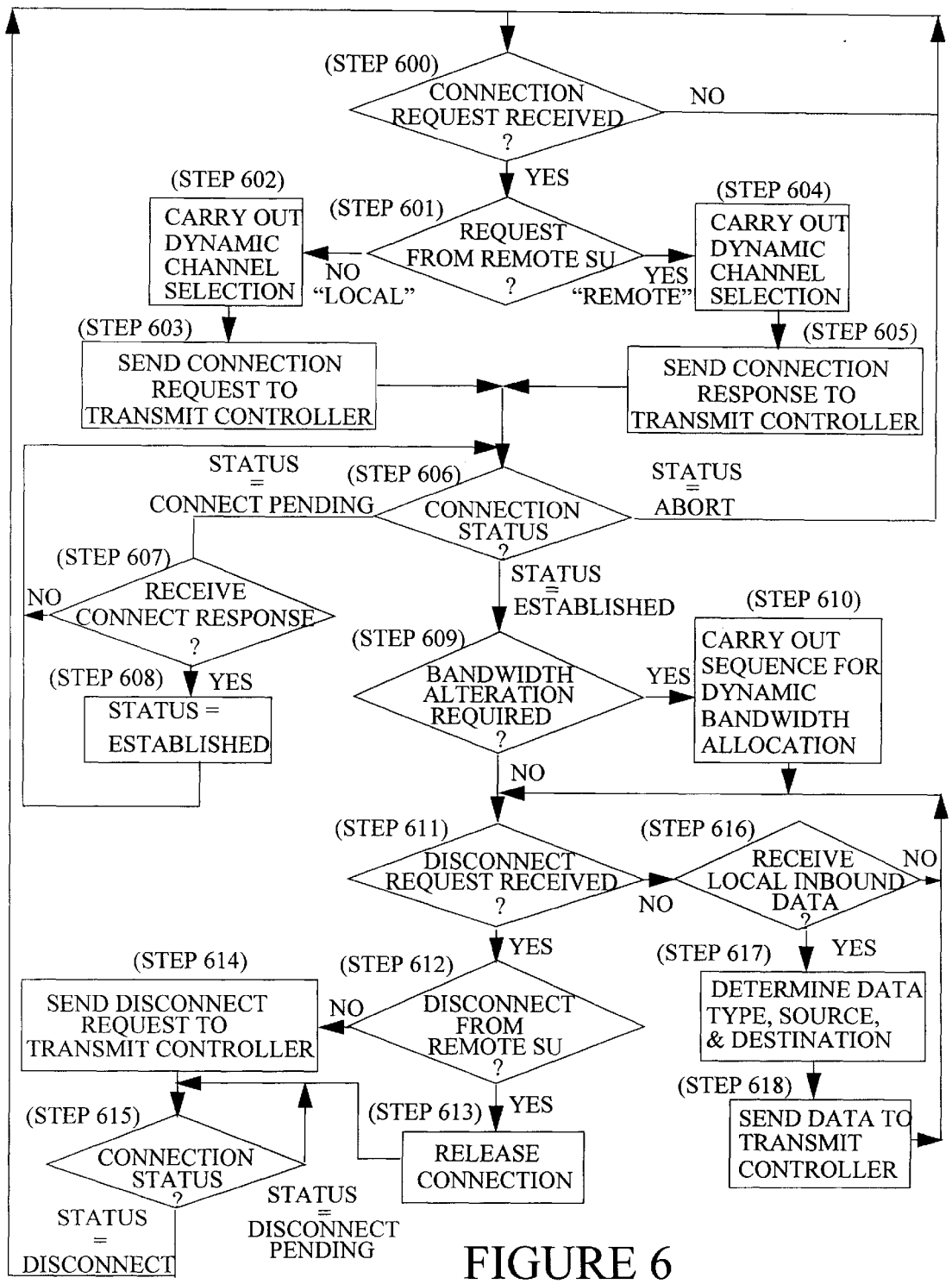
FIG. 6 is a flow chart of some of the steps carried out by receive controller 501 in FIG. 5.

Referring now to FIG. 6 illustrating, as an example, flow charts of the principal steps carried out by receive controller 501 of the central station. In general, receive controller 501 coordinates with transmit controller 502 and the subscriber units (SUs) in carrying out dynamic channel selection as well as dynamic bandwidth allocation in accordance to the present invention. In the preferred embodiment, to carry out dynamic channel selection and dynamic bandwidth allocation, it is assumed that the central station always activates its receiver to monitor signals on all inbound frequencies.

In particular, FIG. 6 illustrates a flow chart of the steps carried out by receive controller 501 to receive and process requests from a SU. In step 600, receive controller 501 monitors inbound frequencies to determine whether a connection request transmitted from a subscriber unit (or a remote central station) on a selected idle frequency has been received. If such connection request has not been received, receive controller 501 continues monitoring the inbound frequencies. Otherwise, receive controller 501 monitors whether the connection request is from a remote station (step 601). If the connection request is from a local SU, receiver controller 501 processes the connection request received to carry out the dynamic channel selection process (step 602). In particular, the dynamic channel selection process for local data transfer involves determining the carrier frequencies to use in communicating with the local SU. Because the connection request normally includes information relates to idle carrier frequencies for transferring local data, receive controller 501 decodes this information and shares it with transmit controller 502. Transmit controller 502 then utilizes an identified frequency to communicate with the initiating SU. Receive controller 501 then initiates and sends a connection request to transmit controller 502 for relaying it to the destination SU (step 603). In so doing, a connection can be established to the destination SU to relay data received from the initiating SU.

If the connection request is from a remote station, receiver controller 501 processes the connection request received to carry out the dynamic channel selection process (step 604). In particular, the dynamic channel selection process for long-distance data transfer involves determining the carrier frequencies to use in communicating with the remote station. Because the connection request normally includes information relates to idle carrier frequencies for transferring long-distance data, receive controller 501 decodes this information and shares it with transmit controller 502. Transmit controller 502 then utilizes an identified frequency to communicate with the remote station. Receive controller 501 then initiates and sends a connection response to transmit controller 502 for relaying it to the remote station (step 605). In so doing, a connection acknowledgment can be made to the remote station. The difference between steps 603 and 605 is necessary because in local data transfer, the central station must initiate a connection with the destination SU, while in long-distance data transfer, the central station only needs to acknowledge a connection initiated by the remote station.

Next, receive controller 501 determines the connection status either between the central station and the destination SU or between the central station and the remote station (step 606). There are three potential connection statuses: connection pending, connection established, and connection abort. If a connection pending status is detected indicating that a connection request was initiated by receive controller 501 (see step 603 above), receive controller 501 monitors its inputs to determine whether a connect response has been received from the destination SU (step 607). In this case, receive controller 501 sets a flag to reflect a connection established status (step 608) and then goes back to step 606 to again monitor the connection status. If a connection abort status is detected indicating the connection has been broken off, receive controller 501 goes back to step 600 to start all over again. If a connection established status is detected indicating that a connection response has been received thereby completing the connection process, receiver controller 501 then determines whether bandwidth alteration is required (step 609). Such bandwidth alteration may be necessary depending on the application of the data transfer (e.g., video transfer).

In the event bandwidth alteration is required, receive controller 501 performs an engagement sequence for dynamic bandwidth allocation in step 610. In carrying out the dynamic bandwidth allocation sequence, the source device (e.g., an initiating SU) and the destination device (e.g., a central station) first establish communications on a predetermined bandwidth. Then, protocol messages to alter the communication bandwidth (i.e., shift up to a higher bandwidth or down to a lower bandwidth) are exchanged between the source and the destination devices as needed. When a communication bandwidth is mutually agreed upon, the transmit controller of the source device begins to transmit at this bandwidth and receive controller 501 of the receive controller of the destination device begins to receive at this bandwidth. Accordingly, the central station's transmit and receive controllers are required to be in constant communications with each other and with their counterparts at the SU or the remote station to dynamically coordinate the bandwidth allocation. Conventional protocols, such as the Multi-Level Point-to-Point Protocol (MLPP) from the Internet Engineering Task Force (IETF), are available for use in implementing the dynamic bandwidth allocation scheme needed in accordance to the present invention. It should be clear to a person of ordinary skill in the art that the implementation of such protocol is well-known and conventional. Receive controller 501 then goes to step 611 below.

If bandwidth alteration is not required, receive controller 501 determines whether a disconnect request, which generally indicates that the data transfer is at the end, has been received in step 611. In the event such disconnect request has not been received, receive controller 501 determines whether inbound data has been received (step 616). If not, receive controller 501 goes back to step 611. Otherwise, upon receiving the demultiplexed data signals via multiplexor bus 503, receive controller 501 interprets the data to determine the data source, data destination, and data type (e.g., local, long-distance, video, voice, text, etc.) (step 617). Receive controller 501 then sends the data along with its type, source, and destination to transmit controller 502 for relaying to the final destination (e.g., either a remote station or a local SU) (step 618).

Figure 7A:
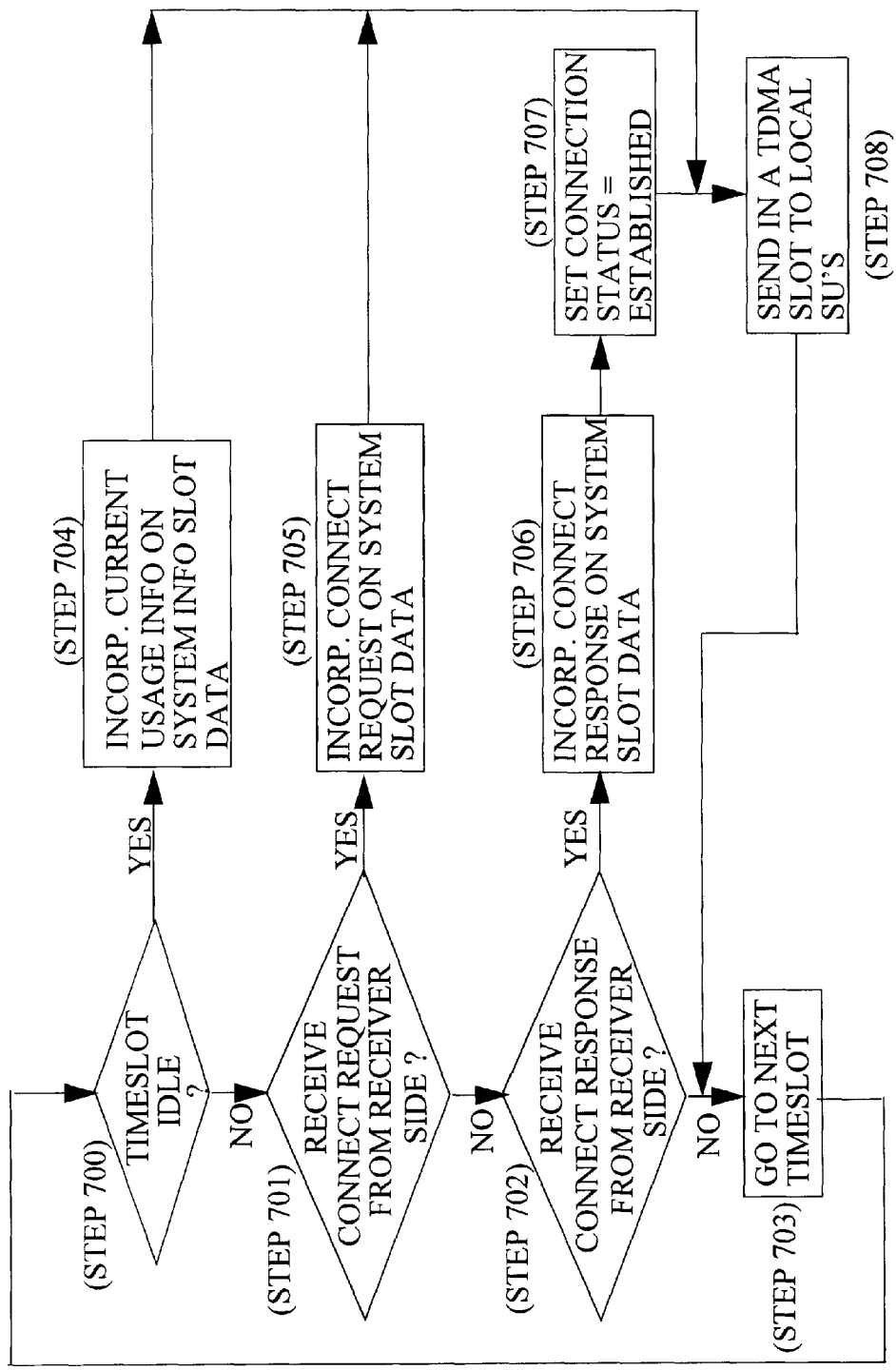
FIGS. 7A–7B illustrate some of the principal states of transmit controller 502 in FIG. 5.
Figure 7B:
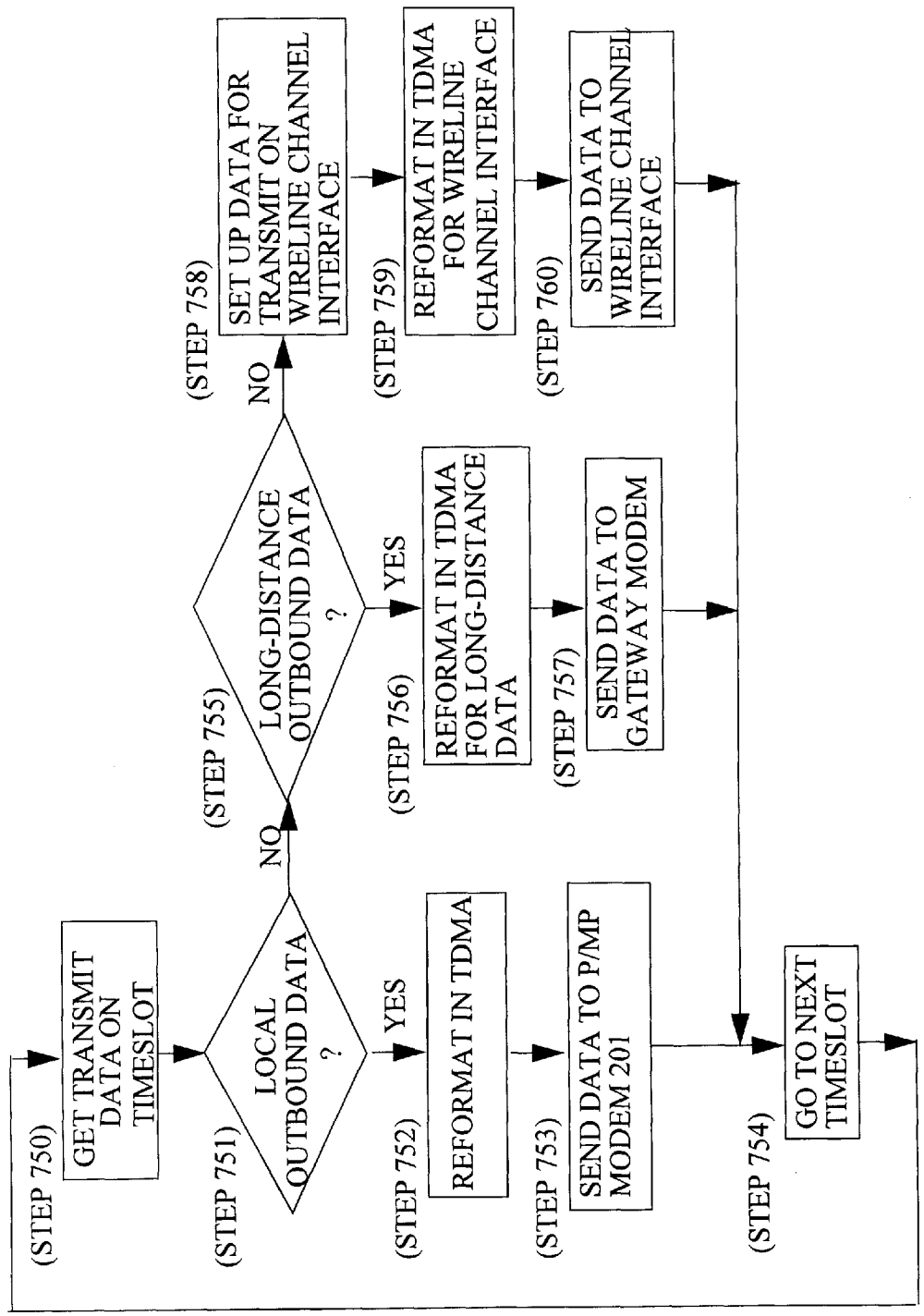

On the other hand, if a disconnect request has been received, receive controller 501 next determines whether the disconnect request is from a remote station (i.e., initiated by a remote SU) (step 612). In the event the disconnect request is from a remote station, the connection is released (step 613) and receive controller 501 goes next to step 615. Conversely, in the event the disconnect request is not from a remote SU indicating that it is a local data transfer operation, receive controller 501 initiates and sends a disconnect request to transmit controller 502 for relaying to the desired local SU to ensure that the connections to both the initiating and destination SU are terminated (step 614). Receive controller 501 then sets its flags to reflect the connection status. Next, receive controller 501 checks the connection status (step 615). At this point, there are two potential statuses: disconnect and disconnect pending. If a disconnect status is detected indicating the current data communication task is complete and all related connections are terminated, receive controller 501 goes back to step 600 to start anew. Otherwise, if a disconnect pending is detected indicating that not all connections are completely terminated, receive controller 501 goes back to step 615 to ensure that all connections are terminated. The above steps or their equivalents can be implemented preferably in hardware (e.g., as part of a state machine) or alternatively, as part of the receive controller's firmware Reference is now made to FIGS. 7A–7B illustrating, as an example, some of the principal states of transmit controller 502. In general, transmit controller 502 coordinates with receive controller 501 and the subscriber units (SUs) in carrying out dynamic channel selection as well as dynamic bandwidth allocation in accordance to the present invention. In the preferred embodiment, to carry out dynamic channel selection and dynamic bandwidth allocation, it is assumed that the central station always transmit on a predetermined timeslot, which is known as the system-info timeslot, the most current information on the usage of both inbound channels and outbound timeslots.

In particular, the steps in FIG. 7A are designed to forward connection requests to a SU and to incorporate data into the system-information timeslot data. Accordingly, in step 700 of FIG. 7A, transmit controller 502 selects a TDMA timeslot and determines whether this timeslot is idle. Preferably, the timeslot is selected in an ascending order (e.g., 0, 1, 2, 3, and so on). If the timeslot selected is idle and therefore available for use in transferring outbound data, transmit controller 502 incorporates the current usage information (e.g., idle frequencies and timeslots) onto the system-info timeslot data (step 704). Otherwise, transmit controller 502 determines whether a connect request is received from receive controller 501 (step 701). If a connect request is received indicating that it is a local data transfer operation and a connection must now be established with a local destination SU, transmit controller 502 incorporates the connect request on the system-info timeslot data (step 705). Transmit controller 502 also determines whether a connect response is received from receive controller 501 (step 702). If a connect response is received indicating that it is a long-distance data transfer operation and a connection acknowledgment to the remote station is due, transmit controller 502 incorporates the connect response on the system-info timeslot data (step 706). Following step 706, transmit controller 502 sets its status flag to indicate that a connection has been established (step 707). It is to be appreciated that steps 700–702 are not sequential and can, therefore, be performed in any order by transmit controller 502.

Following steps 704, 705, or 707, the system-information slot data along with the additional information are sent to the destination local SU over the TDMA timeslot selected (step 708). Next, a different TDMA timeslot is selected for the next data transmission (step 703). As discussed earlier, in the preferred embodiment, TDMA timeslots are selected on an ascending order basis. It should be clear to a person of ordinary skill in the art that TDMA timeslots may be selected on any basis (e.g., descending order, random, etc.). Next, steps 700–702 are performed for the next TDMA timeslot selected. The above steps or their equivalents can be implemented preferably in hardware (e.g., as part of a state machine) or alternatively, as part of the transmit controller's firmware.

The steps in FIG. 7B are designed to decode and process transmit data for all TDMA timeslots including the system-information timeslot. In step 750, transmit controller 502 retrieves the transmit data from the selected TDMA timeslot. Transmit controller 502 then determines whether the data is local outbound data (step 751). If the data is local outbound data, transmit controller 502 reformats the data for TDMA transmission (step 752) and sends it to P/MP modem 201 for transmission to the wireless SUs (step 753). Otherwise, transmit controller 502 determines whether the data is long-distance outbound data (step 755). If the data is long-distance outbound data, transmit controller 502 reformats the data for long-distance TDMA transmission (step 756) and sends it to gateway modem 205 for transmission onto the wireless inter-network.

If the data is neither local outbound data nor long-distance outbound data, it is outbound wireline data. In this case, the data is processed for transmission over wireline channel interface 205 (step 758). The data is then reformatted for wireline TDMA transmission (step 759) and sent to wireline channel interface 205 for transmission to the wireline inter-network and/or wireline SUs. Following steps 753, 757, or 760, the next TDMA timeslot is selected for the next data transmission (step 754). As discussed earlier, in the preferred embodiment, TDMA timeslots are selected on an ascending order basis. It should be clear to a person of ordinary skill in the art that TDMA timeslots may be selected on any basis (e.g., descending order, random, etc.). Next, steps 750–769 are performed for the next TDMA timeslot selected. The above steps or their equivalents can be implemented preferably in hardware (e.g., as part of a state machine) or alternatively, as part of the transmit controller's firmware.

Figure 8:
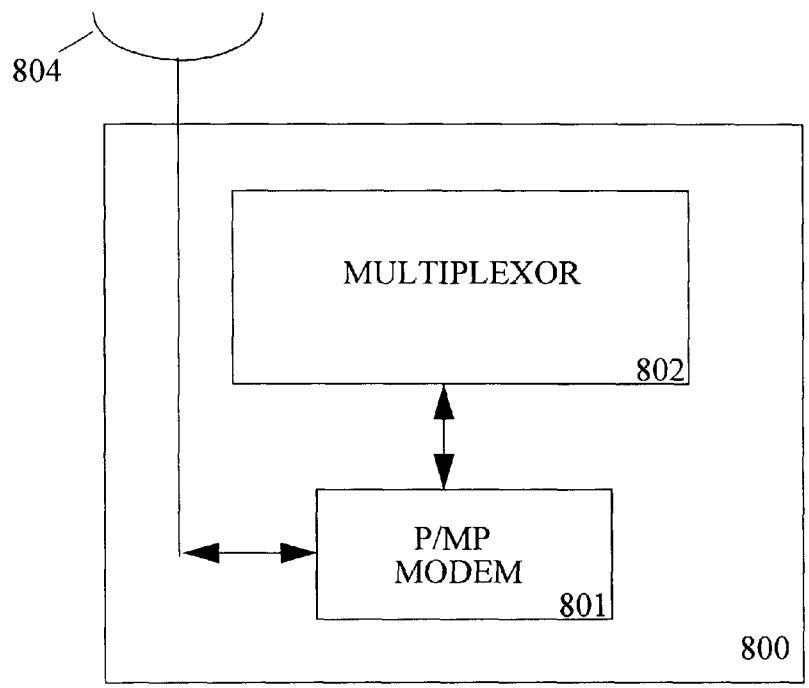
FIG. 8 is a block diagram illustrating a wireless subscriber unit in accordance to the present invention.

Reference is made to FIG. 8 illustrating subscriber unit 800 in accordance to the present invention. Subscriber unit 800 is primarily designed to perform local communications with the local central station in its sub-network where the central station acts as a relay station to connect it with other subscriber units in the sub-network or with remote stations in other sub-networks. Subscriber unit 800 comprises p/mp modem 801, multiplexor 802, and RF antenna 804. As discussed earlier, local outbound data transmitted from the central station is formatted using the TDMA technique with adjustable time slots to dynamically meet the bandwidth requirement of the present communication requirement. A description of the TDMA technique is provided in the discussion accompanying FIG. 4 and is not repeated here.

Figure 9:
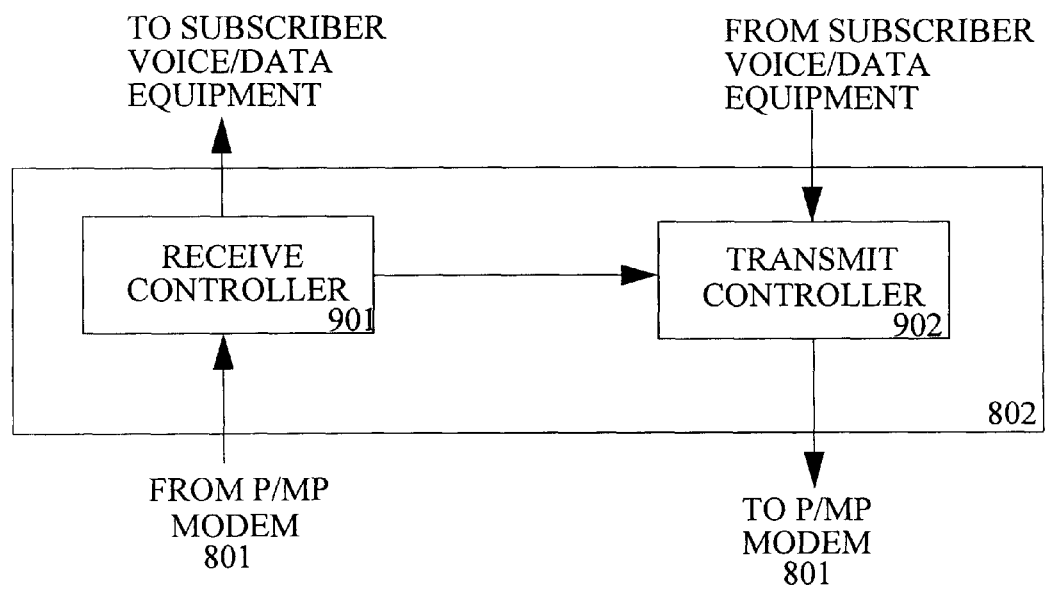
FIG. 9 is a block diagram illustrating multiplexor circuit 802 in accordance to the present invention.

The signal carrying the local outbound data is received by RF antenna 804 which passes it on to p/mp modem 801. P/mp modem 801 demodulates the data and sends it to multiplexor 802. FIG. 9 illustrates in more detail multiplexor 802. As shown in FIG. 9, demodulated data from p/mp modem 801 is sent first to amplifier 903 which boosts the signal strength of the data. The amplified data is then sent to receive controller 901 which decodes the data to determine its type, source, and destination. Using these information, receive controller 901 then interrupts subscriber voice/data equipment 800 to inform it about the incoming data. When the computer system is ready, receive controller transfers the data to subscriber voice/data equipment 800 which processes the data as needed in its application.

Conversely, when subscriber voice/data equipment 800 desires to send data other subscriber units, it signals and sends the request to transmit controller 902. Transmit controller 902 formats the request using the FDMA technique whose description is provided in the discussion associated with FIG. 3 and is not repeated here. The FDMA formatted data is then sent to p/mp modem 801 to be transmitted to the local central station in its sub-network over RF antenna 804.

More particularly, to carry out the dynamic bandwidth allocation scheme in accordance to the present invention, transmit controller 902 is designed to support multiple levels of Frequency Shift Keying (FSK) modulations wherein the On-Off FSK is the basic level, the 4-FSK is the second level, the 8-FSK is the third level, and so on for higher level. Each higher level in the FSK allows a doubling of the information capacity being transmitted. This is done while still preserving the width of the frequency band being used for inbound data. Conversely, receive controller 901 is designed to recombine data from multiple timeslots that is received on the outbound wideband. Such implementation should be clear to a person of ordinary skill in the art and is not further discussed here.

Figure 10:
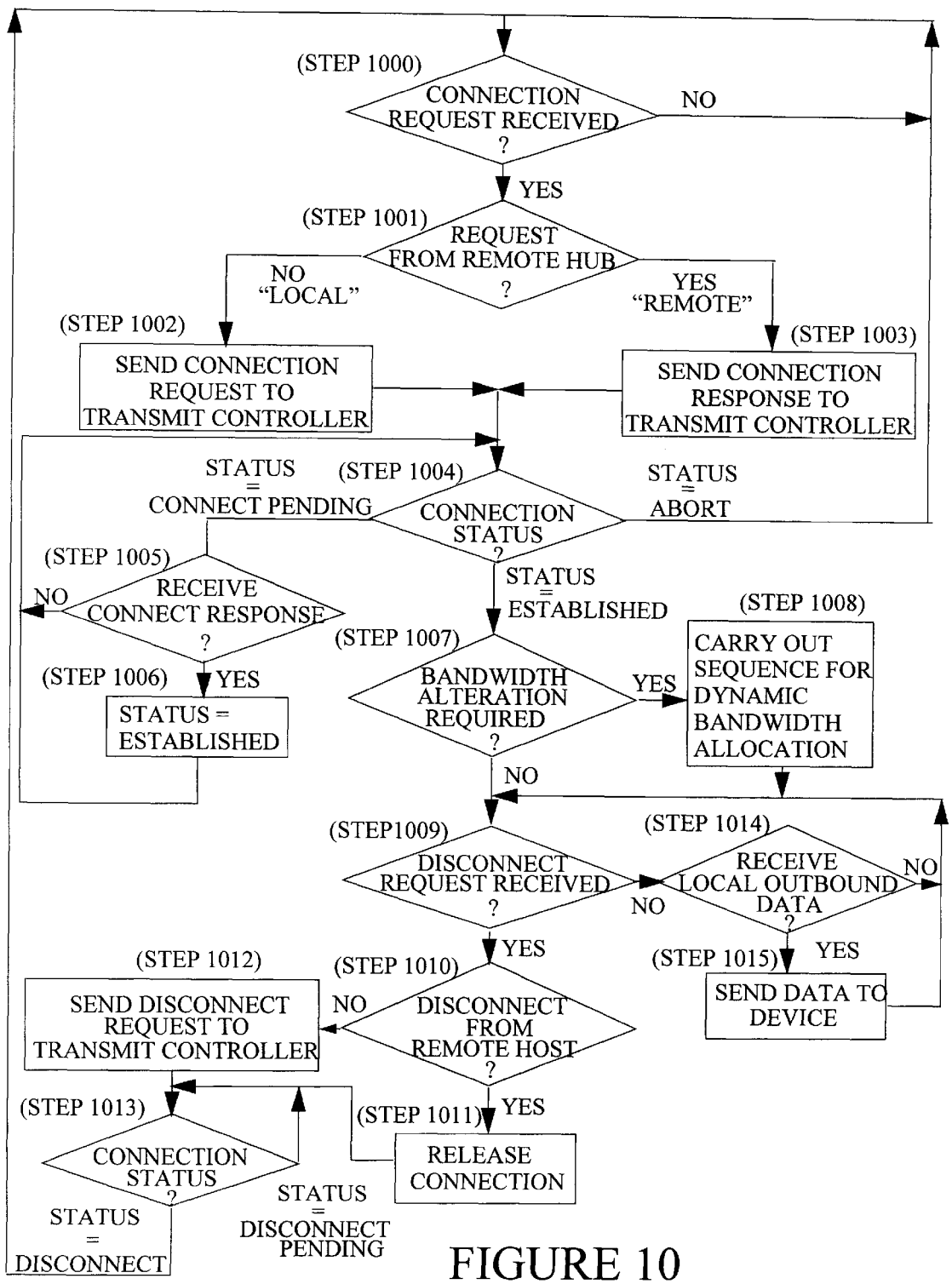
FIG. 10 is a flow chart of some of the steps carried out by receive controller 901 in FIG. 9.

Referring now to FIG. 10 illustrating, as an example, flow charts of the principal steps carried out by receive controller 901 of the SU. In general, receive controller 901 coordinates with transmit controller 902 and the central station in carrying out dynamic channel selection as well as dynamic bandwidth allocation in accordance to the present invention. In the preferred embodiment, to carry out dynamic channel selection and dynamic bandwidth allocation, it is assumed that the SU always activates its receiver to monitor the outbound signal.

In particular, FIG. 10 illustrates a flow chart of the steps carried out by receive controller 901 to initiate new requests to the central station and to process received requests from a central station. In step 1000, receive controller 901 monitors messages on the system information timeslot on the local outbound predetermined frequency to determine whether a connection request transmitted has been received. If such connection request has not been received, receive controller 901 continues monitoring the system information timeslot. Otherwise, if a connection request has been received, receive controller 901 monitors whether the connection request is from a remote central station (remote hub) (step 1001). If the connection request is from the central station (not from the remote hub) indicating that it involves a local data transfer, receive controller 901 initiates and sends a connection request to transmit controller 902 for relaying it to the central station (step 1002). In so doing, a connection can subsequently be established with the central station to relay data received from the initiating SU.

If the connection request is from the remote central station indicating that it involves a long-distance data transfer, receiver controller 901 initiates and sends a connection response to transmit controller 502 for relaying it to the remote station via the central station (step 1003). In so doing, a connection acknowledgment can be made to the remote station. The difference between steps 1002 and 1003 is that the subscriber unit is initiating a new connection request in step 1002 and responding to a far-end connect request in step 1003.

Next, receive controller 901 determines the connection status to the central station (step 1004). There are three potential connection statuses: connection pending, connection established, and connection abort. If a connection pending status is detected, receive controller 901 monitors its inputs to determine whether a connect response has been received from the central station (step 1005). In this case, receive controller 901 sets a flag to reflect a connection established status (step 1006) and then goes back to step 1004 to again monitor the connection status. If a connection abort status is detected indicating the connection has been broken off, receive controller 901 goes back to step 1000 to start all over again. If a connection established status is detected indicating that a connection response has been received thereby completing the connection process, receiver controller 901 then determines whether bandwidth alteration is required (step 1007). Such bandwidth alteration may be necessary depending on the application of the data transfer (e.g., video transfer).

In the event bandwidth alteration is required, receive controller 901 performs an engagement sequence for dynamic bandwidth allocation in step 1008. In carrying out the dynamic bandwidth allocation sequence, the source device (e.g., an initiating SU) and the destination device (e.g., a destination SU) first establish communications on a predetermined bandwidth. Then, protocol messages to alter the communication bandwidth (i.e., shift up to a higher bandwidth or down to a lower bandwidth) are exchanged between the source and the destination devices as needed. When a communication bandwidth is mutually agreed upon, the transmit controller of the source device begins to transmit at this bandwidth and receive controller 901 of the receive controller of the destination device begins to receive at this bandwidth. Accordingly, the central station's transmit and receive controllers are required to be in constant communications with each other and with their counterparts at the SUs or the remote stations to dynamically coordinate the bandwidth allocation. Conventional protocols, such as the Multi-Level Point-to-Point Protocol (MLPP) from the Internet Engineering Task Force (IETF), are available for use in implementing the dynamic bandwidth allocation scheme needed in accordance to the present invention. It should be clear to a person of ordinary skill in the art that the implementation of such protocol is well-known and conventional. Receive controller 901 then goes to step 1009 below.

If bandwidth alteration is not required, receive controller 901 determines whether a disconnect request, which generally indicates that the data transfer is at the end, has been received in step 1009. In the event such disconnect request has not been received, receive controller 901 determines whether outbound data has been received (step 1014). If not, receive controller 901 goes back to step 1009. Otherwise, upon receiving the demultiplexed data signals via multiplexor bus 903, receive controller 901 sends the data along with its type, source, and destination to the final device (e.g., a Data Transmission Terminal connected to the SU) (step 1015).

On the other hand, if a disconnect request has been received, receive controller 901 next determines whether the disconnect request is initiated by a remote station (step 1010). In the event the disconnect request is initiated by a remote station, the connection is released (step 1011) and receive controller 901 goes next to step 1014. Conversely, in the event the disconnect request is not from a remote SU indicating that it is a local data transfer operation, receive controller 901 initiates and sends a disconnect request to transmit controller 902 for relaying to the desired local SU to ensure that the connections to both the initiating and destination SU are terminated (step 1012). Receive controller 901 then sets its flags to reflect the connection status. Next, receive controller 901 checks the connection status (step 1013). At this point, there are two potential statuses: disconnect and disconnect pending. If a disconnect status is detected indicating the current data communication task is complete and all related connections are terminated, receive controller 901 goes back to step 1000 to start anew. Otherwise, if a disconnect pending is detected indicating that not all connections are completely terminated, receive controller 901 goes back to step 1013 to ensure that all connections are terminated. The above steps or their equivalents can be implemented preferably in hardware (e.g., as part of a state machine) or alternatively, as part of the receive controller's firmware.

Figure 11:
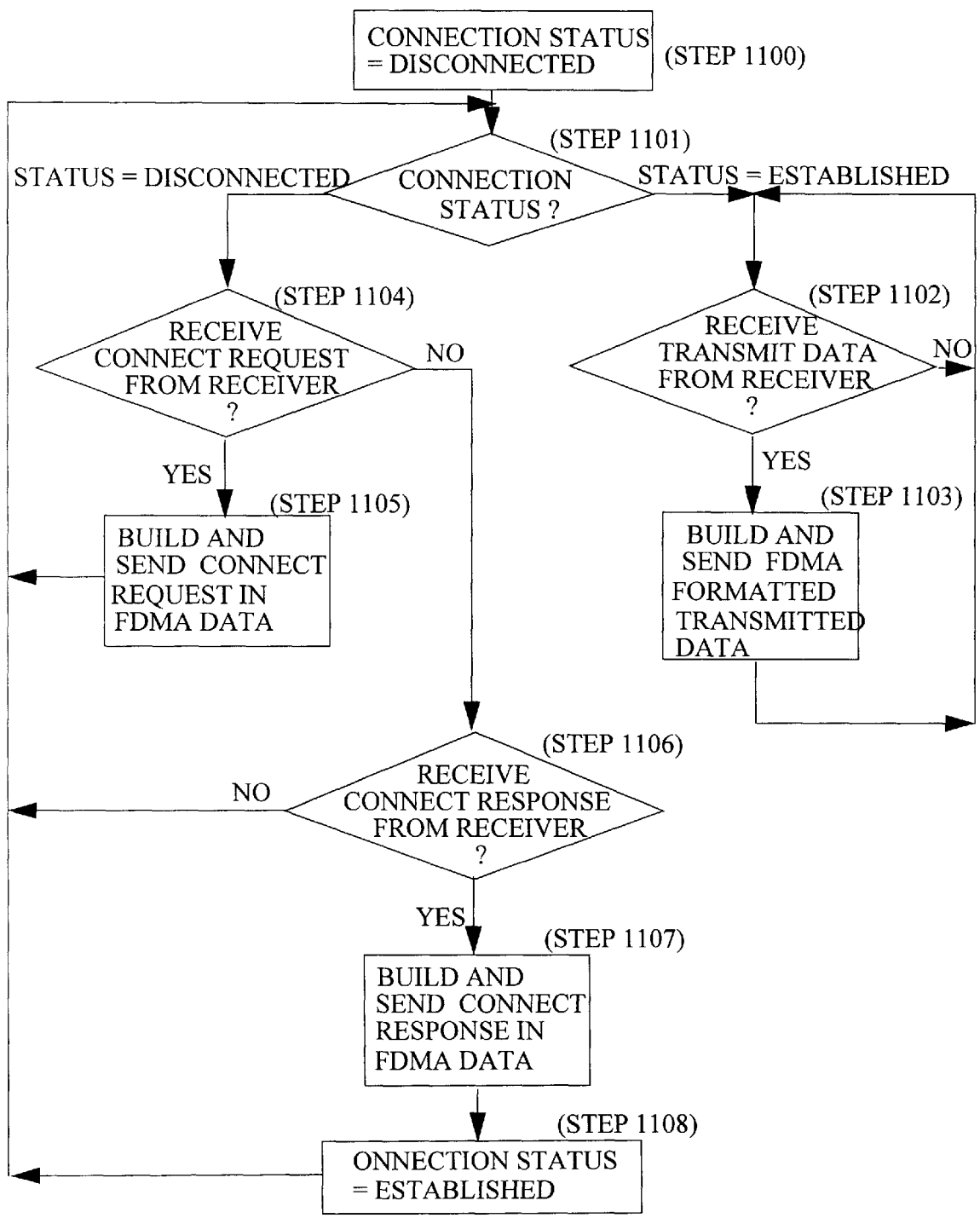
FIG. 11 is a flow chart of some of the steps carried out by transmit controller 902 in FIG. 9.

Reference is now made to FIG. 11 illustrating, as an example, a flow chart illustrating the principal steps carried out by transmit controller 902 of the SU. In general, transmit controller 902 coordinates with receive controller 901 and the central station 200 in relaying data and other information such as connection requests to the final destination as well as handling connection responses received. In step 1100, a disconnect status is detected. Next, transmit controller 902 monitors its connection status with a destination device such as central station 200. There are two potential connection statuses: disconnected and established. If an established status is detected, transmit controller 902 determines whether it has received data from receive controller 901 for transmission. In the event that data has been received, transmit controller 902 formats the data in FDMA and sends it to central station 200 for relaying to the destination device (step 1103). Transmit controller 901 then goes back to step 1101 to continue monitoring its connection status. Otherwise, if transmit controller 902 has not received transmit data, transmit controller 902 goes back to step 1102 to continue checking on the data.

Conversely, if a disconnect status is detected, transmit controller 902 determines whether a connect request has been received from receive controller 901 (step 1104). In the event transmit controller 902 has received such connect request, transmit controller 902 formats the request in FDMA and forwards it to central station 200 for relaying it to its final destination (step 1105). Otherwise, transmit controller 902 determines whether a connect response has been received from receive controller 901 (step 1106). If there is no such response, transmit controller 902 goes back to step 1101 to continue monitoring the connection status. Otherwise, transmit controller 902 sends the connection request on the selected idle frequency (step 1101). Conversely, if a connect response has been received from receive controller 901, transmit controller formats the connect response in FDMA and sends it to central station 200 for relaying it to its final destination (step 1107). Next, transmit controller 902 update its connection status flag to reflect the established status. The above steps or their equivalents can be implemented preferably in hardware (e.g., as part of a state machine) or alternatively, as part of the transmit controller's firmware.

It should be clear to a person of ordinary skill in the art that the components that make up central station 200 and subscriber unit 800 are conventional, well-known, and commercially available telecommunications components. For example, the timeslot interchange chip set T8100 manufactured by Lucent Technologies™ can be combined with the Motorola™ MC68302 micro-controller to implement receive controllers 501 and 901 and transmit controllers 502 and 902. As such, for clarity and brevity, the detailed constructions of the components are not discussed.

The embodiment of the present invention, a dynamic wireless multiplexing/switching system for providing two-way communications to subscriber units, is thus described. While the present invention has been described in particular embodiments, the present invention should not be construed as limited by such embodiments, but rather construed according to the below claims.

What is claimed is:

1. A station apparatus coupled to a wireless local network of subscriber units for providing two-way communications, the station apparatus comprising:

a receiving circuit for receiving at least wireless local inbound data from the subscriber units, the wireless local inbound data being transferred using a Frequency Division Modulation Access (FDMA) technique;

a transmit circuit coupled to the receiving circuit, the transmit circuit transmitting at least wireless local outbound data to the subscriber units, the wireless local outbound data being transmitted using a Time Division Modulation Access (TDMA) technique;

a Radio Frequency (RF) antenna coupled to the receive and transmit circuits, the RF antenna radiating and receiving at least the local inbound and outbound data; and a first modulator-demodulator (modem) circuit coupled to the receive and transmit circuit, the first modem circuit demodulating local inbound data and modulating local outbound data;

wherein under the implemented FDMA technique, a carrier frequency band is allocated to each subscriber unit such that the carrier frequency band is segmented into sub-frequencies for carrying inbound data, the data rate carried within each sub-frequency is varied to accommodate a bandwidth requirement, wherein under the implemented TDMA technique, the local outbound data is transmitted as a plurality of slots in a time sequence such that each slot contains data designated for a particular subscriber unit, the number of the plurality of slots is varied to accommodate a bandwidth requirement of a communication application;

wherein the receive circuit together with the transmit circuit performing dynamic channel selection and bandwidth allocation.

2. The apparatus of claim 1, wherein the wireless local network is coupled to other local networks to make up an inter-network.

3. The apparatus of claim 2, wherein the inter-network is a hybrid wireless-wireline inter-network.

4. The apparatus of claim 3 further comprising a second modem circuit coupled to the receive and transmit circuits for demodulating long-distance inbound data received from remote stations of the other local networks and modulating long-distance outbound data transmitted to the other local networks, wherein the long-distance inbound and outbound data are formatted using the Time Division Modulation Access (TDMA) technique.

5. The apparatus of claim 3, wherein the receiving circuit comprising:

a multiplexing bus for receiving local inbound data that is separated based on their carrier frequencies; and a receiving controller coupled to the multiplexing bus, the receiving controller receiving the separated local inbound data, the receiving controller determines data type, source, and destination of the local inbound data, the receiving controller providing as output the local inbound data and information on data type, source, and destination.

6. The apparatus of claim 5, wherein the transmit circuit comprising a transmit controller coupled to the receiving controller, the transmit controller reformatting the local inbound data in time domain using the TDMA technique wherein the time slot that the data is transmitted in is adjusted to accommodate the bandwidth requirement of the data type, transmit controller determining whether the local inbound data is to be broadcast to local subscriber units or to remote stations, if the local inbound data is to be broadcast to local subscriber units, the local inbound data is sent to the first modem circuit, if the local inbound data is to be broadcast to remote stations, the local inbound data is sent to the second modem circuit.

7. The apparatus of claim 6, wherein the transmit controller further receiving input signals carrying long-distance inbound data from remote stations, the transmit controller determining whether the long distance inbound data is to be broadcast to local subscriber units or to remote stations, if the long-distance inbound data is to be broadcast to local subscriber units, the long-distance inbound data is sent to the first modem circuit, if the long-distance inbound data is to be broadcast to remote stations, the long-distance inbound data is sent to the second modem circuit.

8. The apparatus of claim 7, wherein the transmit controller directing inbound data from any subscriber unit to outbound data of any other subscriber unit and to any timeslot-based channel of any gateway or wireline subscriber unit, the transmit controller further directing inbound data of any timeslot-based channel of any gateway or wireline subscriber unit to outbound data of any other wireline subscriber unit and to any subscriber unit.

9. The apparatus of claim 8, wherein the transmit controller extracting data packets from inbound data of any subscriber unit and routing the data packets to outbound data of any other subscriber unit and to any channel of any gateway link, the transmit controller extracting data packets from inbound data of any channel of any gateway link and routing the data packets to outbound data of any other gateway link and to any subscriber unit.

10. A subscriber unit apparatus coupled to a wireless local network of subscriber units for providing two-way communications, the subscriber unit apparatus comprising:

a receiving circuit for receiving wireless local outbound data from a local central station, the wireless local outbound data being transferred using a Time Division Modulation Access (TDMA) technique;

a transmit circuit coupled to the receiving circuit, the transmit circuit transmitting wireless local inbound data to the local central station, the wireless local inbound data being transmitted using a Frequency Division Modulation Access (FDMA) technique;

a Radio Frequency (RF) antenna coupled to the receive and transmit circuits, the RF antenna radiating and receiving at least the local inbound and outbound data; and a first modem circuit coupled to the receive and transmit circuit, the first modem circuit demodulating local outbound data and modulating local inbound data;

wherein under the implemented FDMA technique, a carrier frequency band is allocated to each subscriber unit such that the carrier frequency band is segmented into sub-frequencies for carrying inbound data, the data rate carried within each sub-frequency is varied to accommodate a bandwidth requirement, wherein under the implemented TDMA technique, the local inbound data is transmitted as a plurality of slots in a time sequence such that each slot contains data designated for a particular subscriber unit, the number of the plurality of slots is varied to accommodate a bandwidth requirement of a communication application;

wherein the receive circuit and the transmit circuit performing dynamic channel selection and bandwidth allocation.

11. The apparatus of claim 10, wherein the wireless local network is coupled to other local networks to make up an inter-network.

12. The apparatus of claim 11, wherein the inter-network is a hybrid wireless-wireline inter-network.

13. The apparatus of claim 11, wherein the receiving circuit comprising a receiving controller receiving as input signals carrying the local outbound data, the receiving controller receiving the local outbound data, the receiving controller determines data type, source, and destination of the local outbound data, the receiving controller providing as output the local outbound data and information on data type, source, and destination.

14. The apparatus of claim 13, wherein the transmit circuit comprising a transmit controller, the transmit controller reformatting the local inbound data in frequency domain using the FDMA technique wherein a carrier frequency band is allocated to each subscriber unit such that the carrier frequency band is divided into a transmit carrier frequency band and a receive carrier frequency band, the transmit circuit sending local inbound data to the modem circuit.

15. A wireless local network comprising:
a local central station; and
a plurality of local subscriber units in communication with the central station;
the local central station acting as a data relay station for at least the local subscriber units, the central station comprising:
a receiving circuit for receiving at least wireless local inbound data from the subscriber units, the wireless local inbound data being transferred using a Frequency Division Modulation Access (FDMA) technique;
a transmit circuit coupled to the receiving circuit, the transmit circuit transmitting at least wireless local outbound data to the subscriber units, the wireless local outbound data being transmitted using a Time Division Modulation Access (TDMA) technique;
a Radio Frequency (RF) antenna coupled to the receive and transmit circuits, the RF antenna radiating and receiving at least the local inbound and outbound data; and
a first modulator-demodulator (modem) circuit coupled to the receive and transmit circuit, the first modem circuit demodulating local inbound data and modulating local outbound data;
each of the local subscriber comprising:
a receiving circuit for receiving wireless local outbound data from the local central station, the wireless local outbound data being transferred using a Time Division Modulation Access (TDMA) technique;
a transmit circuit coupled to the receiving circuit, the transmit circuit transmitting wireless local inbound data to the local central station, the wireless local outbound data being transmitted using a Frequency Division Modulation Access (FDMA) technique;
a Radio Frequency (RF) antenna coupled to the receive and transmit circuits, the RF antenna radiating and receiving at least the local inbound and outbound data;

wherein under the implemented FDMA technique, a carrier frequency band is allocated to each subscriber unit such that the carrier frequency band is segmented into sub-frequencies for carrying inbound data, the data rate carried within each sub-frequency is varied to accommodate a bandwidth requirement of a communication application;

wherein under the implemented TDMA technique, data is transmitted as a plurality of slots in a time sequence such that each slot contains data designated for a particular subscriber unit, the number of the plurality of slots is varied to accommodate a bandwidth requirement of a communication application;

wherein the local central station together with the subscriber units performing dynamic channel selection and dynamic bandwidth allocation.

16. The wireless local network of claim 15, wherein the wireless local network is coupled to other local networks to make up an inter-network.

17. The wireless local network of claim 16, wherein the local central station further comprising a second modem circuit coupled to the receive and transmit circuits for demodulating long-distance inbound data received from remote stations of the other local networks and modulating long-distance outbound data transmitted to the other local networks, wherein the long-distance inbound and outbound data are formatted using the Time Division Modulation Access (TDMA) technique.

18. The wireless local network of claim 17, wherein the inter-network is a hybrid wireless-wireline inter-network.

19. A method to provide two-way communications to subscriber units in a wireless local network, the method comprising:
receiving at least wireless local inbound data from the subscriber units, the wireless local inbound data being transferred using a Frequency Division Modulation Access (FDMA) technique; and
transmitting at least wireless local outbound data to the subscriber units, the wireless local outbound data being transmitted using a Time Division Modulation Access (TDMA) technique;
wherein under the implemented FDMA technique, a carrier frequency band is allocated to each subscriber unit such that the carrier frequency band is segmented into sub-frequencies for carrying inbound data, the data rate carried within each sub-frequency is varied dynamically to accommodate a bandwidth requirement of a communication application and channel selection is performed dynamically;
wherein under the implemented TDMA technique, the local outbound data is transmitted as a plurality of slots in a time sequence such that each slot contains data designated for a particular subscriber unit, the number of the plurality of slots is varied dynamically to accommodate a bandwidth requirement of a communication application and channel selection is performed dynamically.

20. The method of claim 19, wherein the wireless local network is coupled to other local networks to make up an inter-network.

21. The method of claim 20, wherein the inter-network is a hybrid wireless-wireline inter-network.

22. The method of claim 21 further comprising the steps of:

receiving long-distance inbound data from other central stations, the long-distance inbound data being transferred using a Time Division Modulation Access (TDMA) technique; and transmitting long-distance outbound data to other central stations, the long-distance outbound data being transmitted using a Time Division Modulation Access (TDMA) technique.

23. The method of claim 22 further comprising the step of implementing a middle frequency guardband to separate the sub-frequencies of the carrier frequency band to allow for communication between subscriber units in a local network and between point-to-point stations for longer-distance communication.

24. The method of claim 19, wherein the receiving step comprising the step of:

determining data type, source, and destination of the local inbound data.

25. The method of claim 24, wherein the transmit step comprising the steps of:

reformatting the local inbound data in time domain using the TDMA technique wherein the time slot that the data is transmitted in is adjusted to accommodate the bandwidth requirement of the data type;

determining whether the local inbound data is to be broadcast to local subscriber units or to remote stations;

if the local inbound data is to be broadcast to local subscriber units, broadcasting the local inbound data to the subscriber units; and if the local inbound data is to be broadcast to remote stations, broadcasting the local inbound data to the remote stations.

26. The method of claim 25, wherein the transmit controller further receiving input signals carrying long-distance inbound data from remote stations, the transmit step further comprising the steps of:

determining whether the long distance inbound data is to be broadcast to local subscriber units, to remote stations, or to wireline channel interfaces;

if the long-distance inbound data is to be broadcast to local subscriber units, send the long-distance inbound data to the first modem;

if the long-distance inbound data is to be broadcast to remote stations, send the long-distance inbound data to the second modem; and if the long-distance inbound data is to be broadcast to wireline channel interfaces, send the long-distance inbound data to the wireline channel interfaces.

27. A method to provide two-way communications to subscriber units in a wireless local network, the method comprising:

receiving at least wireless local outbound data from a local central station, the wireless local outbound data being transferred using a Time Division Modulation Access (TDMA) technique; and transmitting at least wireless local inbound data to the local central station, the wireless local inbound data being transmitted using a Frequency Division Modulation Access (FDMA) technique;

wherein under the implemented FDMA technique, a carrier frequency band is allocated to each subscriber unit such that the carrier frequency band is segmented into sub-frequencies for carrying inbound data, the data rate carried within each sub-frequency is varied dynamically to accommodate a bandwidth requirement of a communication application and channel selection is performed dynamically;

wherein under the implemented TDMA technique, the local outbound data is transmitted as a plurality of slots in a time sequence such that each slot contains data designated for a particular subscriber unit, the number of the plurality of slots is varied dynamically to accommodate a bandwidth requirement of a communication application and channel selection is performed dynamically.

28. The method of claim 27, wherein the wireless local network is coupled to other local networks to make up an inter-network.

29. The method of claim 28, wherein the inter-network is a hybrid wireless-wireline inter-network.

30. The method of claim 27, wherein the receiving step comprising the step of:

determining data type, source, and destination of the local outbound data on a predetermined timeslot.

31. The method of claim 30, wherein the transmit step comprising the step of:

reformatting the local inbound data in frequency domain using the FDMA technique wherein a carrier frequency band is allocated to each subscriber unit such that the carrier frequency band is segmented into sub-frequencies for carrying inbound data, the transmit circuit sending local outbound data to the modem circuit; and transmitting the local outbound data to a local central station.

* * * * *